United States Patent [19]

Gauger

[11] Patent Number: 4,969,582
[45] Date of Patent: Nov. 13, 1990

[54] APPARATUS FOR FEEDING AN ELONGATED FASTENER TO A FASTENING TOOL, ESPECIALLY FOR FEEDING A STUD IN A STUD WELDER

[75] Inventor: Wolfgang Gauger, Iserlohn, Fed. Rep. of Germany

[73] Assignee: Obo Bettermann OHG., Menden, Fed. Rep. of Germany

[21] Appl. No.: 271,991

[22] Filed: Nov. 15, 1988

[30] Foreign Application Priority Data

Nov. 25, 1987 [DE] Fed. Rep. of Germany ....... 3739944

[51] Int. Cl.$^5$ .................................................. B25C 7/00
[52] U.S. Cl. ..................................... 221/260; 227/145; 227/149; 221/267; 221/268
[58] Field of Search ...................... 221/260, 267, 268; 227/119, 149, 145, 60

[56] References Cited

U.S. PATENT DOCUMENTS

| 38,924 | 6/1863 | Wicke | 227/149 |
|---|---|---|---|
| 1,369,872 | 3/1921 | Ziegler | 227/145 |
| 1,403,104 | 1/1922 | Peyer | 227/145 |
| 1,485,413 | 3/1924 | Johanson | 227/119 |
| 2,475,527 | 7/1949 | Stilwell | 227/145 |
| 3,398,446 | 8/1968 | Karlsson | 227/149 |
| 4,410,125 | 10/1983 | Noiles et al. | 227/145 |

Primary Examiner—Andres Kashnikow
Assistant Examiner—W. T. Waffner
Attorney, Agent, or Firm—Herbert Dubno

[57] ABSTRACT

To provide an apparatus for feeding an elongated fastener to a fastening tool, in which the fasteners are fed individually through a first passage and are forced into a holder by a plunger guided in a second additional passage and in which comparatively short fasteners can be fed without jamming or other difficulty in an orderly way, the first passage extending through the apparatus is substantially linear until at the holder positioned coaxial to it, the second passage opens at an acute angle to the first passage and the plunger is made from a flexible material so that the plunger is positionable in an end position outside the first passage and also in a forwardly moved fastener feed position which corresponds to another end position partially in the second and partially in the first passage.

6 Claims, 1 Drawing Sheet

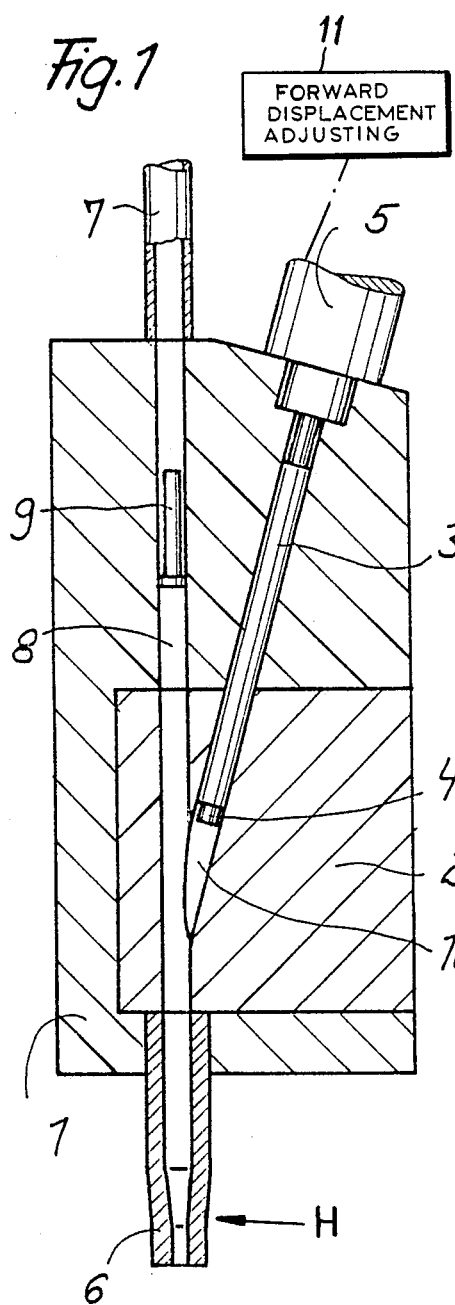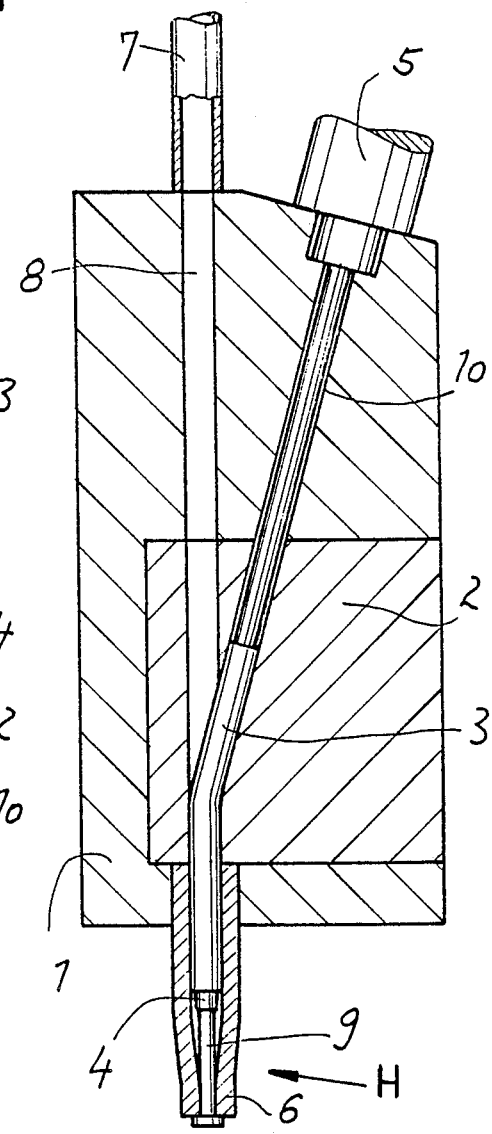

APPARATUS FOR FEEDING AN ELONGATED FASTENER TO A FASTENING TOOL, ESPECIALLY FOR FEEDING A STUD IN A STUD WELDER

FIELD OF THE INVENTION

My present invention relates to an apparatus for feeding an elongated fastener to a fastening tool and, more particularly, to an apparatus for feeding a stud to a welding head in a stud welder.

BACKGROUND OF THE INVENTION

An apparatus for feeding a fastener, especially a fastener which is elongated such as a stud or the like, to a fastening tool such as the welding head in a stud welder is known. The fasteners are forced individually through a first passage in the apparatus and into a holding means such as a chuck or the like by a plunger in another, second passage.

This apparatus is described for example in U.S. Pat. No. 3,339,799.

In this known apparatus the stud is fed through a first passage which opens into a second passage at an acute angle and, as soon as the stud has passed the opening into the second passage, is conveyed into a chuck or the like by a conveying member. The plunger is guided in another passage which is substantially aligned with and coaxial to the chuck.

It has been found to be a disadvantage, particularly with a very short stud or with a stud which has a head which is comparatively large in diameter and a shaft which is comparatively thin, that the stud can be oriented transversely in the vicinity of the opening of the first passage into the second passage so that the passage can become blocked by a jammed stud and the feeding of other studs to the chuck by the plunger is prevented.

Advantageously in the above-described apparatus, the plunger need only be axially slidable. Pivoting of the plunger is not required for feeding a stud.

In another stud welding unit, e.g. as described in German Patent No. 34 08 930, only one passage is provided in which a pivotable plunger or detent is engagable and axially slidable. This plunger or detent however must be pivoted out from the passage to allow the stud to pass. After that occurs the plunger is swung back into the passage to convey the stud by axial sliding into the holding means, especially a chuck. The kinematics of this type of stud welder is even more complicated than the stud welder first described above.

OBJECTS OF THE INVENTION

It is an object of my invention to provide an apparatus for feeding an elongated fastener to a fastening tool, especially a stud in a stud welder, which guarantees an orderly trouble-free feed of fasteners to a holding means, particularly a chuck, especially for a comparatively short fastener such as a stud which has a comparatively thin shaft and a large flange-like head portion.

Another object is to provide an improved stud feeder for a stud welder which is free from the drawbacks of prior art systems as described.

Summary of the Invention

These objects and others which will become more readily apparent hereinafter are attained, in accordance with my invention, in an apparatus for feeding a fastener, especially a fastener which is elongated such as a stud or the like, to a fastening tool such as the welding head of a stud welder.

According to my invention, the first passage extending through the apparatus is substantially linear until it reaches a holding means positioned substantially coaxially with the first passage, a second passage opens into the first passage at an acute angle thereto and the plunger is flexible and moveable into an end position outside of the first passage and into a forwardly moved fastener feed position partially in the second passage and partially in the first passage.

Because the first passage extending through the apparatus is linear up to the holding means, particularly a chuck in the case of a stud welder, coaxial with the first passage, it is guaranteed that shorter studs or also bolts with comparatively thin shafts and larger head or foot portions can be fed in the correct orientation through these passages to the holding means.

Conventionally, this type of stud or the like is fed by compressed air to the appropriate passage in which a comparatively high speed is attained so that practically no orientation change of the stud, bolt or the like occurs in its travel past the opening of the second passage.

Because the second passage opens at an acute angle to the first passage, disturbances in the feed of the fastener or the stud are prevented. The flexible construction of the plunger guarantees that the conveying member, when the bolt or stud has passed the opening, can be pushed forward and because of its flexibility, can change direction from the second passage into the first passage until the plunger has forced the fastener into the holding means, i.e. the chuck or the like.

Advantageously, in the opening where the plunger meets the wall of the first passage one can provide a wall of wear-resistant material to avoid wear at that place as a result of the engagement and deflection of the conveying member.

Advantageously, the second passage is also linear. However the second passage can also be curved, even though a linear second passage is more desirable.

The plunger can be advantageously operated by an external force.

It is possible to manually operate the conveying member. However, it is provided that the plunger can be connected to a drive member which can be driven by a pneumatic, hydraulic or electrical drive unit or motor. The drive unit is adjustable in its longitudinal motion to set the longitudinal motion of the plunger to different stud or bolt lengths.

Furthermore, the plunger can comprise a flexible rod. Also the free end of the plunger can have tip piece fitting the shape of an end of the bolt or stud. A replaceable tip piece can be provided on the end of the flexible plunger which can be fitted to different stud or bolt geometries.

BRIEF DESCRIPTION OF THE DRAWING

The above and other objects, features and advantages of my invention will become more readily apparent from the following description, reference being made to the accompanying highly diagrammatic drawing in which:

FIG. 1 is a schematic longitudinal cross-sectional view of an apparatus for feeding an elongated fastener according to my invention in one working configuration; and FIG. 2 is a schematic longitudinal cross-sectional view of the apparatus of FIG. 1 in another second working configuration.

SPECIFIC DESCRIPTION

The apparatus for feeding an elongated fastener such as a stud 9 or the like to a fastening tool, e.g. a chuck or holding means 6 of the welding head H of a stud welder, comprises a housing 1 in which a wear-resistant housing insert 2 is placed. A linear first passage 8 is provided through the housing 1 and the housing insert 2. The studs 9 are fed separately through this first passage 8.

The studs 9 are individually separated in a separating mechanism (not shown) and are individually fed by a feed tube 7 to the first passage 8. The studs 9 are fed by compressed air until they are located just upstream of the holding means 6. To force the studs 9 into the holding means 6, a plunger 3 is provided in another, second passage 10 with a tip piece 4. The plunger 3 is longitudinally slidable by a drive member 5 in the second passage 10. FIG. 1 shows the plunger 3 in one end position entirely outside the first passage 8.

The plunger 3 is made from a flexible material. Particularly, it can be a flexible rod as in this embodiment.

As soon as the studs 9 have passed the mouth or opening between the first passage 8 and the second passage 10, the plunger 3 is moved by the drive member 5 as is apparent from FIG. 2. FIG. 2 shows the plunger 3 in another end position, a forwardly moved fastener feed position, in which it is partially in the first passage 8 and partially in the second passage 10. Thus the desired position inside the holding means 6 is attained by choosing a suitable longitudinal dimension for the displacement of the plunger 3 which is made to correspond with the length of the stud 9. A device 11 allows the adjustability of the forward displacement of the plunge 3.

The plunger 3 can then be retracted so that the first passage 8 is open for feeding the next stud 9 after welding the first stud 9 found in the holding means 6.

In the above embodiment, the holding means 6 is a chuck as is conventional in a stud welder.

The stud 9 in this embodiment is one example of the fastener referred to in the claims and specification.

My invention is not limited to the details of the specific description but may be varied in many ways within the scope of this disclosure.

All new features and combinations of features disclosed in the description and/or the drawing are considered to be part of my invention.

I claim:

1. An apparatus for feeding a fastener, especially a stud or the like, to a fastening tool such as the welding head of a stud welder, comprising:
    a holding means for said fastener; and
    a housing formed with:
        a linear first passage passing through said housing to said holding means, said fasteners being forced individually through said first passage and into said holding means and being coaxial with said first passage,
        a substantially linear second passage joining said first passage at an acute angle thereto; and
        a flexible plunger operable by an external force and located in said second passage, said plunger being moveable into an end position thereof outside of said first passage and into a forwardly moved fastener feed position partially in said second passage and partially in said first passage, said fastener, said plunger and said first passage being coaxial at said end position of said plunger, said holding means being provided with third passage coaxial with and connected with said first passage.

2. An apparatus for feeding fasteners, comprising:
    a housing, said housing being provided with:
    a first passage extending substantially linearly along a first axis coinciding with an axis of a fastener fed therealong, said fasteners being forced axially individually through said first passage along a path, and
    a second passage extending along a second axis intersecting said first axis at an acute angle therewith, said second passage opening into said first passage;
    means for guiding a respective fastener downstream of said path through said first passage, said means for guiding being provided with a flexible plunger movable reciprocatingly in a second passage and extending into said first passage and becoming coaxial therewith upon engagement between said fastener and said plunger; and
    holding means coaxial with said first passage for holding said fastener, said plunger guiding said fastener toward said holding means upon said engagement of said fastener by said plunger.

3. The apparatus defined in claim 1 wherein said holding means is formed with another passage coaxial with said first passage, said plunger extending into said other passage upon said contact.

4. The apparatus defined in claim 1, further comprising means for adjusting a forward displacement of said plunger into said first passage.

5. The apparatus defined in claim 1 wherein said plunger is formed with a tip piece fitting a shape of an end of said plunger contacting said fastener.

6. The apparatus defined in claim 1 wherein said second passage is substantially linear.

* * * * *